(12) United States Patent
Xia et al.

(10) Patent No.: US 10,055,785 B2
(45) Date of Patent: Aug. 21, 2018

(54) THREE-DIMENSIONAL SHOPPING PLATFORM DISPLAYING SYSTEM

(71) Applicant: SPREADTRUM COMMUNICATIONS (SHANGHAI) CO., LTD., Shanghai (CN)

(72) Inventors: Lu Xia, Shanghai (CN); Hengzhuang Jin, Shanghai (CN); Haipeng Liu, Shanghai (CN)

(73) Assignee: SPREADTRUM COMMUNICATIONS (SHANGHAI) CO., LTD. (CN)

( * ) Notice: Subject to any disclaimer, the term of this patent is extended or adjusted under 35 U.S.C. 154(b) by 0 days.

(21) Appl. No.: 14/130,975

(22) PCT Filed: Dec. 18, 2013

(86) PCT No.: PCT/CN2013/089811
§ 371 (c)(1),
(2) Date: Jan. 6, 2014

(87) PCT Pub. No.: WO2014/201826
PCT Pub. Date: Dec. 24, 2014

(65) Prior Publication Data
US 2016/0132962 A1    May 12, 2016

(30) Foreign Application Priority Data
Jun. 17, 2013  (CN) .......................... 2013 1 0240073

(51) Int. Cl.
*G06Q 30/00*     (2012.01)
*G06Q 30/06*     (2012.01)
(Continued)

(52) U.S. Cl.
CPC ......... *G06Q 30/0643* (2013.01); *G06F 3/017* (2013.01); *G06F 3/0346* (2013.01);
(Continued)

(58) Field of Classification Search
CPC .................................................. G06Q 30/0643
(Continued)

(56) References Cited

U.S. PATENT DOCUMENTS 5,848,399 A * 12/1998 Burke .................. G06Q 10/087
235/383
5,930,769 A * 7/1999 Rose ...................... G06Q 30/06
345/419

(Continued)

FOREIGN PATENT DOCUMENTS

CN      101096878 A     1/2008
CN      102768747 A     11/2012

OTHER PUBLICATIONS

Shen, X., Nourian, S., Hertanto, I., & Georganas, N., vCOM: Virtual commerce in a collaborative 3D world. (2001). Retrieved from ProQuest. Web. Mar. 27, 2018.*

*Primary Examiner* — Alexis Casey
(74) *Attorney, Agent, or Firm* — Schmeiser, Olsen & Watts, LLP

(57) ABSTRACT

A three-dimensional model, a display module, a motion capture module and a perspective switch module is provided. The perspective switch module is respectively connected to the display module and the motion capture module. A preset-sized graphic displaying area is defined in the display module. The motion capture module changes the relative position between the graphic displaying area and the three-dimensional model according to the manipulation of the user. The perspective switch module adjusts the three-dimensional model according to the control instruction transmitted by the motion capture module. Simultaneously, the different graphic data are displayed within the graphic displaying area. The graphic data are the projections of the three-dimensional model in the plane of graphic displaying area.

5 Claims, 1 Drawing Sheet

(51) Int. Cl.
  *G06F 3/01* (2006.01)
  *G06F 3/0346* (2013.01)
  *G06F 3/0481* (2013.01)
  *G06F 3/0484* (2013.01)
  *G06F 3/0488* (2013.01)
  *G06F 3/0489* (2013.01)
  *G06T 17/00* (2006.01)

(52) U.S. Cl.
  CPC ........ *G06F 3/0489* (2013.01); *G06F 3/04815* (2013.01); *G06F 3/04845* (2013.01); *G06F 3/04883* (2013.01); *G06Q 30/0641* (2013.01); *G06T 17/00* (2013.01)

(58) Field of Classification Search
  USPC ....................................................... 705/27.2
  See application file for complete search history.

(56) References Cited

U.S. PATENT DOCUMENTS

| | | | | |
|---|---|---|---|---|
| 6,026,377 | A * | 2/2000 | Burke | G06Q 10/087 235/383 |
| 6,262,694 | B1 * | 7/2001 | Ishimoto | H04N 13/0239 345/1.1 |
| 6,304,855 | B1 * | 10/2001 | Burke | G06Q 10/087 235/383 |
| 6,879,322 | B2 * | 4/2005 | Iida | G06T 11/206 345/419 |
| 8,260,689 | B2 * | 9/2012 | Dollens | G06Q 30/0603 345/619 |
| 2001/0050687 | A1 * | 12/2001 | Iida | G06T 11/206 345/581 |
| 2003/0216176 | A1 * | 11/2003 | Shimizu | A63F 13/10 463/31 |
| 2007/0179867 | A1 * | 8/2007 | Glazer | G06Q 30/0253 705/26.43 |
| 2009/0182499 | A1 * | 7/2009 | Bravo | G01C 21/20 701/408 |
| 2009/0265671 | A1 * | 10/2009 | Sachs | G06F 3/017 715/863 |
| 2009/0303204 | A1 * | 12/2009 | Nasiri | A63F 13/06 345/184 |
| 2010/0070378 | A1 * | 3/2010 | Trotman | G06Q 30/02 705/26.1 |
| 2010/0304754 | A1 * | 12/2010 | Czompo | H04W 52/0254 455/456.1 |
| 2011/0221777 | A1 * | 9/2011 | Ke | G06F 3/017 345/649 |
| 2012/0223943 | A1 * | 9/2012 | Williams | G06Q 30/06 345/419 |
| 2014/0221090 | A1 * | 8/2014 | Mutschler | G06F 3/011 463/31 |

* cited by examiner

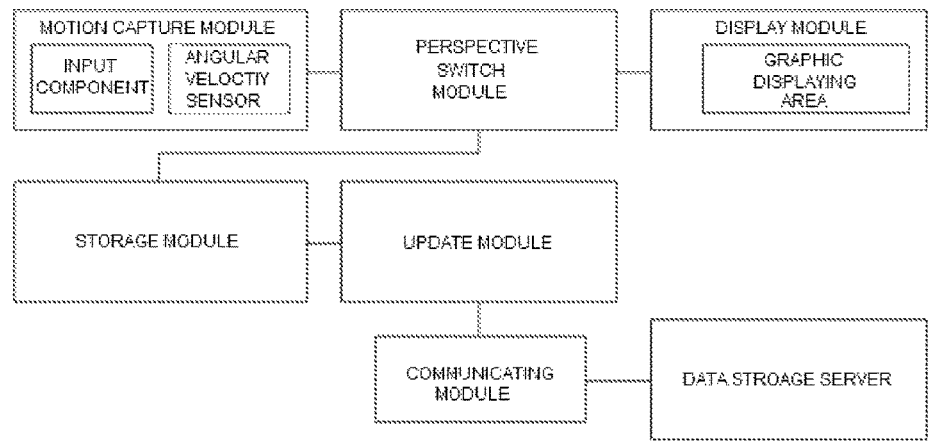

THREE-DIMENSIONAL SHOPPING PLATFORM DISPLAYING SYSTEM

TECHNICAL FIELD

The present invention relates to the technical field of shopping platform display, more specifically, to a three-dimensional shopping platform displaying system.

BACKGROUND OF THE INVENTION

With the development of the Internet communication technology, the online shopping platforms are popular to the people. The shopping center has transferred from the physical stores to the online stores. For example, many famous online shopping platforms have attracted people's attention and have changed their consumption custom. However, almost all the traditional online shopping platforms are appeared before the user by applying a display method of two-dimensional surface, which provides with a limited experience of direct vision.

For instance, the display mode of the traditional online shopping platform is searching by user, displaying the listing and displaying the detailed information. The information displayed includes the drawings or the verbal description of the goods for sale. However, it is still difficult for the user to have a completely understanding on the appearance style of the merchandise, which increases the risk of buying defectives. The said defects can be improved by the method of three-dimensional imaging which displays every surface of the object providing the user with a comprehensive visual experience and a complete understanding of the good for sale.

Likewise, in the traditional online shopping platform, the manipulation of the user is inputting the searching instructions by a keyboard or a touch screen and selecting or purchasing goods by clicking the mouse or touching the screen. The operations is complicated and of no improvement for user experience.

Chinese Patent No. CN102768747A has disclosed a rapid display system for three-dimensional exhibition halls, shops and streets, wherein it comprises: 3D(three-dimensional) max technique or the direct photography technology is used by a designer to obtain pictures; next, the rendered walls, the grounds and the goods shelves are directly imported into scenes creating a whole scene and goods shelves; next, the shelves are set with the information of goods displaying positions; and, the operator shall just add the goods on the designated positions. The displaying method mentioned above is mainly applied to the large places, such as the exhibition hall, and it does not fit for the private personal online shopping. Simultaneously, the cost of applying the technical scheme is relatively high.

Chinese Patent No. CN102096878A has disclosed a quick 3D imaging technology of internet 3D shopping applicable to the traditional and terminal internet. It comprises: configuring an object in a special 3D imaging device; using a high-resolution digital camera for carrying out multi-frame imaging on the object at the horizontal angle from 0° to 360° and the vertical angle from 0° to 360°; processing an imaged picture to form the same into a corresponding picture and cartoon as the sale of the 3D internet shopping, consequently, a purchaser can observe the 3D internet object from different angles or dynamically observe in the horizontal direction and the vertical direction; configuring the object in the special 3D imaging device and the high-resolution digital camera is used for carrying out multi-frame imaging on the details of the object, processing imaged picture to form the same into the corresponding picture and cartoon, so that the purchaser can amplify and observe the details of the object. The above mentioned technical scheme is related to capturing the model of the 3D object, which does not cover the display and the distribution of the whole 3D store area.

SUMMARY OF THE INVENTION

Due to the defects existing in the prior art, a three-dimensional shopping platform displaying system is disclosed, comprising a three-dimensional shopping platform displays in the mobile terminal, wherein the three-dimensional shopping platform displaying system comprising:
  a three-dimensional model;
  a display unit;
  a motion capture unit; and
  a perspective switch unit;
  wherein, the perspective switch unit is respectively connected to the display unit and the motion capture unit; a graphic displaying area with a preset size is defined in the display unit; the relative position of the graphic displaying area and the three-dimensional model is changed by the motion capture unit according to the manipulation of the user; the corresponding control instruction is transmitted to the perspective switch unit by the motion capture unit; the three-dimensional model is adjusted by the preset strategy adopted by the perspective switch unit according to the control instruction transmitted by the motion capture unit; the different graphic data are displayed by the perspective switch unit within the graphic displaying area; and the graphic data are the projection of the three-dimensional model in the plane of the graphic displaying area.

According to the above three-dimensional shopping platform displaying system, wherein further comprising: a storage unit; the model units of the three-dimensional shopping platform and the basic data for combining the three-dimensional model are preset in the storage unit; and according to the basic data and the model units, different three-dimensional models are formed by the three-dimensional shopping platform.

According to the above three-dimensional shopping platform displaying system, wherein further comprising: an update unit; the update unit is connected to the storage unit; and the update unit is remotely connected to a plurality of external data storage servers by a communicating unit; the update unit is used for obtaining the basic data from a plurality of the data storage servers; and the update unit stores the basic data in the storage unit.

According to the above three-dimensional shopping platform displaying system, wherein the three-dimensional model is provided with an XOY-axis; and the motion capture unit changes the coordinate of the graphic displaying area relative to the three-dimensional model to determine the position of the graphic displaying area relative to the three-dimensional model.

According to the above three-dimensional shopping platform displaying system, wherein the motion capture unit comprises an input component of the mobile terminal and an angular velocity sensor; the input components are used for inputting the operating instructions for the user; according to the operating instructions, the motion capture unit changes the coordinate of the graphic displaying area relative to the three-dimensional model to determine the position of the graphic displaying area relative to the three-dimensional model; the angular velocity sensor is used for capturing the current posture of the mobile terminal; according to the current posture of the mobile terminal, the motion capture unit changes the angle of the graphic displaying area relative to the three-dimensional model to determine the position of the graphic displaying area relative to the three-dimensional model; and according to the position of the graphic displaying area relative to the three-dimensional model, the motion capture unit transmits the corresponding control instruction to the perspective switch unit.

According to the above three-dimensional shopping platform displaying system, wherein the input component is a touch screen and/or a keyboard.

According to the above three-dimensional shopping platform displaying system, wherein the angular velocity sensor is a three-axis-accelerometer.

According to the above three-dimensional shopping platform displaying system, wherein the preset strategies comprising:

when the graphic displaying area gradually gets close to the three-dimensional model, the three-dimensional model is zoomed in by the perspective switch unit;

when the graphic displaying area gradually gets away from the three-dimensional model, the three-dimensional model is zoomed out by the perspective switch unit; and when the angle between the graphic displaying area and the three-dimensional model is changed, the three-dimensional model is rotated by the perspective switch unit correspondingly.

According to the above three-dimensional shopping platform displaying system, wherein the graphic displaying area is located on the display screen of the mobile terminals; and the graphic data is displayed on the display screen of the mobile terminal.

A shopping platform system, wherein applying the above three-dimensional shopping platform displaying system;

the three-dimensional model is used for indicating the blocks of the shopping platform system;

the model unit is used for indicating the stores of the shopping platform system;

the model unit further comprises displaying areas for displaying the information and/or a plurality of the second three-dimensional models; and the displaying areas are adjusted based on the three-dimensional model.

According to the above shopping platform system, wherein the second three-dimensional model is used for indicating the commodities of the shopping platform system.

The advantageous effects of the above technical solution are as but not limited to: displaying the arrangement of blocks of variable stores in mobile terminal; facilitating the user for purchase; providing intuitive visual experience and simple operations; shortening user's shopping process; and promoting the entertainment of online shopping.

BRIEF DESCRIPTIONS OF THE DRAWINGS

FIG. 1 shows a structure diagram of the three-dimensional shopping platform displaying system in the embodiment of the present invention.

DESCRIPTIONS OF THE PREFERRED EMBODIMENT

The present invention will be further illustrated in combination with the following figures and embodiments, but it should not be deemed as limitation of the present invention.

In the embodiment of the present invention, as referred in FIG. 1, a system capable of displaying the three-dimensional model of the virtual stores and merchandise on the display screen of the mobile terminal is adopted. The system is applied in the mobile terminals including the mobile phones, the tablet computers and the other portable electronic devices. A three-dimensional model is defined on the system. The system is not a physical model but a virtual model composed by a variety of data. The system also comprises as follows:

a display unit where a graphic displaying area is defined. The graphic displaying area has a preconfigured size which matches with that of the display screen of the mobile terminal. An XOY-axis is defined in the said three-dimensional model. The graphic displaying area has a coordinate position relative to the three-dimensional model. The coordinate position can be used for determining the position of the graphic displaying area relative to the three-dimensional model, such as the distance and the angle relative to the three-dimensional model;

a perspective switch unit which is connected to the display unit. The perspective switch unit is used for adjusting the three-dimensional model according to the position of the graphic displaying area relative to the three-dimensional model and is used for displaying the corresponding graphic data which is a part of the projection of the three-dimensional model relative to the plane on the graphic displaying area; and a motion capture unit which is connected to the perspective switch unit. The motion capture unit changes the coordinate value of the graphic displaying area relative to the three-dimensional model by capturing the manipulation of the user to determine the position of the graphic displaying area relative to the three-dimensional model, such as the distance and the angle. The motion capture unit transmits the corresponding control instruction to the perspective switch unit according to the said relative position. The perspective switch unit obtains the corresponding graphic data according to the control instruction and displays the graphic data in the graphic displaying area used for being checked by the user.

In the embodiment of the present invention, the said motion capture unit comprises two methods of capturing methods, i.e., 1. The key instruction or other command instruction performed in the mobile terminals by the user is captured by the touch screen or the keyboard of the mobile phone. For example, the user clicks or double-clicks the touch screen or uses the keyboard data manipulating instruction or uses two fingers to zoom in and out.

2. The manipulation performed by uses, such as movement, rotation and overturning, is captured by the angular velocity sensor of the mobile phone to determine the current position of the mobile phone. For example, the current angel of the mobile phone, such as overturning angel and rotation angel, is sensed by the three-axis-accelerometer on the mobile phone to determine the current posture of the mobile phone.

Meanwhile, in other embodiments of the present invention, other auxiliary tools as barometers can also be used to determine the position of the mobile phone in height. However, in this embodiment, the coordinate system set in the three-dimensional model should be X-Y-Z-axis to make up the defect that XOY-axis is unable to indicate the height.

When the corresponding control instruction of the position of the graphic displaying area relative to the three-dimensional model is transmitted to the perspective switch unit by the motion capture unit, the perspective switch unit initially adjusts the three-dimensional model to conform to the real visual experience obtained by watching the three-dimensional model in the first perspective of the user.

Thereafter, a part of the projection of the three-dimensional model, i.e., the graphic data, which can be actually seen by the user is displayed in the graphic displaying area by the perspective switch unit.

In the embodiment of the present invention, it is necessary to add a storage unit to the said system. The storage unit keeps the unit units, i.e., the basic three-dimensional model without being added by any content, used for composing the three-dimensional model inside. The storage unit also keeps the basic data used for forming the different three-dimensional models composed of the said model units inside. The basic data comprises the different position data of the different model units located on the three-dimensional model. The storage unit is connected to the perspective switch unit.

In the embodiment of the present invention, an update unit is also comprised, which is connected to the said storage unit and is remotely connected to a plurality of the external data storage servers by a communicating unit. The update unit obtains the basic data from a plurality of the external data storage servers and stores them in the storage unit. The said data storage server in the embodiment of the present invention can be a server of the traditional online shopping platform as well as a specially constructed large server for storing the basic data. When the system is switched on for the first time, the update unit is responsible for the initialization of the entire system, i.e., the update unit obtains the basic data from the remote data storage server by the communicating unit and stores the basic data in the storage unit. Next, the model units and the basic data in the storage unit are grouped into the different three-dimensional models for being obtained by the perspective switch unit. When the Internet connection is available during the operation of the system, the latest basic data are obtained from the server by the update unit remotely to be grouped into the three-dimensional model. When the Internet connection is not available, the object of the combination of the three-dimensional model is the basic data existed in the storage unit. Alternatively, when the Internet is available, the system will automatically download the real-time data from the remote server to update the three-dimensional model. When Internet is not available, the system will automatically obtain the existed three-dimensional model and display the three-dimensional model in the graphic displaying area.

In the embodiment of the present invention, a three-dimensional model represents a virtual block, and each model unit located in the three-dimensional model represents a virtual store. A plurality of displaying areas respectively for displaying the corresponding information and/or the second three-dimensional models are set on each model unit. Each second three-dimensional model represents a kind of virtual merchandise. The three-dimensional shopping platform comprises a plurality of virtual blocks formed by the three-dimensional models. A plurality of the virtual stores are configured trimly in each block. Various virtual merchandises, i.e., the second three-dimensional models, are configured trimly in each virtual store. The walls of each virtual store are decorated by the virtual store names, advertisements and other reminding information, such as the discount information and the information of the new arrivals. The said information is displayed in the displaying area used for displaying the corresponding information. When the reminding information, such as the discount information, is obtained by the update unit from the data storage server, the system adds the different method of reminding into the previous three-dimensional model to attract user's attention.

In the embodiment of the present invention, the user watches the graphic data displayed in the graphic displaying area in their first perspective, i.e., the three-dimensional model in the system enables the user to interact with the blocks, stores and merchandises existed in the real world in their first perspective. For example, what the user saw in the virtual block is the same as the objects observed in the real world in their first perspective. The steps of adjusting the three-dimensional model by the perspective switch unit according to the first perspective of user are described as follows.

When the perspective switch unit adjusts the three-dimensional model according to the control instruction, the pre-configured strategies adopted are that as follows, when the graphic displaying area gradually gets close to the three-dimensional model, the three-dimensional model is zoomed in gradually by the perspective switch unit. When the graphic displaying area gradually gets away from the three-dimensional model, the three-dimensional model is zoomed out gradually by the perspective switch unit. When the angle between the graphic displaying area and the three-dimensional model is changed, the three-dimensional model is rotated correspondingly by the perspective switch unit. And the adjustment of rotating or overturning the three-dimensional model conforming to the perspective rules is also comprised. In the embodiment of the present invention, the said rotation comprises the horizontal rotation which rotates the three-dimensional model in the horizontal plane for an angle from 0° to 360°, when the user rotates the mobile phone horizontally; the vertical rotation which rotates the three-dimensional model in the vertical plane for an angle from 0° to 360°, when the user rotates the mobile phone vertically, and adjusting the relative position of the three-dimensional model by the combination of the said horizontal rotation and the said vertical rotation.

The visual effects of the adjustments for user are that as follow, when the user uses the operation instruction of zooming in, such as the operation of zooming in is preformed on the touch screen by two fingers, the motion capture unit changes the relative coordinate between the graphic displaying area and the three-dimensional model according to the content of the operation instruction to determine the position of the graphic displaying area relative to the three-dimensional model, and the control instruction is transmitted to the perspective switch unit by the motion capture unit. The three-dimensional model is zoomed in by the perspective switch unit to a size which is the same as that seen in the real world by the user. The parts of the graphic data which can be seen by the user are displayed in the graphic displaying area by the perspective switch unit. For example, parts of the stores in the whole block are displayed in the graphic displaying area, which is provided for being watched by user. The above effect is gradually changed relative to what is not zoomed in. The displaying lens gradually gets close for the user;

when using the operation instruction of zooming out, such as the operation of zooming out is preformed on the touch screen by two fingers, the motion capture unit also changes the relative coordinate of the graphic displaying area to determine the position of the graphic displaying area relative to the three-dimensional model and transmits the control instruction to the perspective switch unit. The three-dimensional model is zoomed out by the perspective switch unit to a size same as that seen in the real world by the user. The parts of the graphic data which can be seen by the user are displayed in the graphic displaying area by the perspective switch unit. For example, the number of the stores which can be displayed is gradually increased relative to the operation of zooming in. The displaying lens gradually gets far away for the user;

when the user changes the content displayed in the graphic displaying area by rotating the mobile phone, the motion capture unit changes the coordinate of the graphic displaying area relative to the three-dimensional model by capturing the current posture of the mobile phone, such as by capturing the current angle and angular velocity of the mobile phone, to determine the relative position of the graphic displaying area. The perspective switch unit rotates the three-dimensional model for a certain angle same as that seen in the real world by the user, where the rotation can be a operation of rotating in the horizontal plane or a operation of rotating in the vertical plane or a combination of the operation of rotating both in the horizontal plane and the vertical plane, according to the corresponding control instruction of the motion capture unit. The parts of the graphic data which can be seen by the user are displayed in the graphic displaying area by the perspective switch unit. For example, a part of the store in the block, such as a part of the outer walls, is displayed, or a part of the stores which can be seen by the user in the present angle are displayed;

when the user adopts a certain operation instruction to overlap the graphic displaying area with a certain model unit, i.e., a virtual store, the user enters the model unit. Each model unit comprises not only an external surface which can be displayed on the display screen but also an internal structure. When the user enters a model unit, the graphic data displayed in the graphic displaying area is a part of the internal structure of the model unit. As both the external surface and the internal structure of the model unit are the parts of the whole three-dimensional model, the operations of zooming in, zooming out, rotation or overturning performed to the model unit are the same as those preformed to the three-dimensional model. The conversions seen by the user on the display screen while the operations of zooming in, zooming out, rotation or overturning are performed to the model unit are the same as those seen by the user while the same operations are performed to the three-dimensional model.

The graphic data displayed in the said graphic displaying area are actually displayed on the display screen of the mobile terminal. However, in the three-dimensional model, the parts of the graphic data displayed on the display screen could be seen by the user, and the other parts of the three-dimensional model are just existed logically, i.e., the entirety of the three-dimensional model is existed logically, and what is displayed on the display screen is a part of the projection of the three-dimensional model that in accordance with the scene which could be seen by the user in the real world. Adopting the said system, the user can enjoy the joy of the online shopping just as shopping in the physical stores. Both the entertainment and the sense of realness of online shopping are promoted.

Although a typical embodiment of a particular structure of the specific implementation way has been given with the above description and the figures, it is appreciated that other changes based on the spirit of this invention may also be made. Though the preferred embodiments are proposed above, these contents will never be the limitation of this invention.

It is obvious for the skilled in the art to make varieties of changes and modifications after reading the above descriptions. Hence, the Claims attached should be regarded as all the changes and modifications which cover the real intention and the range of this invention. Any and all equivalent contents and ranges in the range of the Claims should be regarded belonging to the intention and the range of this invention.

The invention claimed is:

1. A three-dimensional shopping platform displaying system, the three-dimensional shopping platform displaying system displays in a mobile terminal, the three-dimensional shopping platform displaying system comprising:
   a three-dimensional model;
   a display unit;
   a motion capture unit;
   a perspective switch unit respectively connected to the display unit and the motion capture unit; and
   a graphic displaying area with a preset size defined in the display unit, wherein a relative position of the graphic displaying area and the three-dimensional model is changed by the motion capture unit according to a manipulation of a user;
   wherein a corresponding control instruction is transmitted to the perspective switch unit by the motion capture unit, and the three-dimensional model is adjusted by a preset strategy adopted by the perspective switch unit according to the corresponding control instruction transmitted by the motion capture unit, the three-dimensional model is adjusted by the perspective switch unit according to the first perspective of the user;
   wherein different graphic data is displayed by the perspective switch unit within the graphic displaying area, and each of the different graphic data is a projection of the three-dimensional model in a plane of the graphic displaying area;
   a storage unit, model units of the three-dimensional shopping platform displaying system and basic data for combining the three-dimensional model are preset in the storage unit, and according to the basic data and the model units, different three-dimensional models are formed by the three-dimensional shopping platform;
   wherein the three-dimensional model is used for indicating blocks of the three-dimensional shopping platform system;
   wherein each of the model units is used for indicating stores of the three-dimensional shopping platform system;
   wherein each of the model units further comprises displaying areas for displaying information and/or a plurality of second three-dimensional models, and the displaying areas are adjusted based on the second three-dimensional model;
   an update unit, the update unit being connected to the storage unit, wherein the update unit is remotely connected to a plurality of external data storage servers by a communicating unit, wherein the update unit is used for obtaining the basic data from the plurality of external data storage servers, and the update unit stores the basic data in the storage unit;
   wherein, when an Internet connection is available during an operation of the three-dimensional shopping platform displaying system, a latest one of the basic data are obtained from one of the plurality of external data storage servers by the update unit remotely to be grouped into the three-dimensional model, and when the Internet connection is not available, combination of the three-dimensional model is based on the basic data in the storage unit;

wherein the blocks and stores of the shopping platform are distinctively decorated;

wherein the three-dimensional model is provided with an XOY-axis, and the motion capture unit changes a coordinate of the graphic displaying area relative to the three-dimensional model to determine a position of the graphic displaying area relative to the three-dimensional model;

wherein the motion capture unit comprises an input component of the mobile terminal and an angular velocity sensor, further wherein the input component is used for inputting operating instructions for the user, the angular velocity sensor being used for capturing a current posture of the mobile terminal;

wherein, according to the operating instructions, the motion capture unit changes coordinate of the graphic displaying area relative to the three-dimensional model to determine a position of the graphic displaying area relative to the three-dimensional model;

wherein, according to the current posture of the mobile terminal, the motion capture unit changes an angle of the graphic displaying area relative to the three-dimensional model to determine the position of the graphic displaying area relative to the three-dimensional model, and according to the position of the graphic displaying area relative to the three-dimensional model, the motion capture unit transmits corresponding control instruction to the perspective switch unit;

wherein, when the user adopts a certain operation instruction to overlap the graphic displaying area with a model unit, the user enters the model unit, the model unit comprising not only an external surface which can be displayed on the display screen but also an internal structure.

2. The three-dimensional shopping platform displaying system as disclosed in claim 1, wherein the input component is a touch screen and/or a keyboard.

3. The three-dimensional shopping platform displaying system as disclosed in claim 1, wherein the angular velocity sensor is a three-axis-accelerometer.

4. The three-dimensional shopping platform displaying system as disclosed in claim 2, wherein the preset strategy comprises:

when the graphic displaying area gradually gets close to the three-dimensional model, the three-dimensional model is zoomed in by the perspective switch unit;

when the graphic displaying area gradually gets away from the three-dimensional model, the three-dimensional model is zoomed out by the perspective switch unit; and when the angle between the graphic displaying area and the three-dimensional model is changed, the three-dimensional model is rotated by the perspective switch unit correspondingly;

when the user uses the operation instruction of zooming in, operation of zooming in is performed on the touch screen by two fingers, the motion capture unit changes relative coordinate between the graphic displaying area and the three-dimensional model according to content of the operation instruction to determine the position of the graphic displaying area relative to the three-dimensional model, and control instruction is transmitted to the perspective switch unit by the motion capture unit;

wherein the three-dimensional model is zoomed in by the perspective switch unit to a size which is the same as that seen in real-world by the user; parts of graphic data which can be seen by the user are displayed in the graphic displaying area by the perspective switch unit, parts of the stores in a whole block are displayed in the graphic displaying area, which is provided for being watched by the user;

when the when using operation instruction of zooming out, operation of zooming out is preformed on the touch screen by two fingers, the motion capture unit also changes the relative coordinate of the graphic displaying area to determine the position of the graphic displaying area relative to the three-dimensional model and transmits control instruction to the perspective switch unit the three-dimensional model is zoomed out by the perspective switch unit to a size same as that seen in the real world by the user; Parts of the graphic data which can be seen by the user are displayed in the graphic displaying area by the perspective switch unit, number of the stores which can be displayed is gradually increased relative to operation of zooming in;

when the user changes content displayed in the graphic displaying area by rotating the mobile phone, the motion capture unit changes the coordinate of the graphic displaying area relative to the three-dimensional model by capturing current posture of the mobile phone, to determine relative position of the graphic displaying area; the perspective switch unit rotates the three-dimensional model for a certain angle same as that seen in the real world by the user, where rotation can be a operation of rotating in the horizontal plane or a operation of rotating in the vertical plane or a combination of the operation of rotating both in the horizontal plane and the vertical plane, according to corresponding control instruction of the motion capture unit parts of the graphic data which can be seen by the user are displayed in the graphic displaying area by the perspective switch unit, a part of store in the block is displayed.

5. The three-dimensional shopping platform displaying system as disclosed in claim 1, wherein the graphic displaying area is located on a display screen of the mobile terminals, and the graphic data is displayed on the display screen of the mobile terminal.

* * * * *